United States Patent [19]
Norden

[11] 3,764,956
[45] Oct. 9, 1973

[54] ELECTRIC METER SOCKET
[75] Inventor: Alexander R. Norden, New York, N.Y.
[73] Assignee: General Switch Company, Great Neck, N.Y.
[22] Filed: Dec. 27, 1971
[21] Appl. No.: 212,124

[52] U.S. Cl............ 339/74 R, 317/107, 339/192 RL
[51] Int. Cl. ......................... H01r 13/62, H02b 9/00
[58] Field of Search ................. 339/19, 74 R, 75 R, 339/31 B, 198 M; 317/104, 107, 108

[56] References Cited
UNITED STATES PATENTS
3,003,085   10/1961   Rund .................................. 317/107
3,164,751   1/1965    Lewis.................................. 317/108
2,782,387   2/1957    Coleman.............................. 339/19

Primary Examiner—Marvin A. Champion
Assistant Examiner—William F. Pate, III
Attorney—Harry Cohen

[57] ABSTRACT

An electric watt-hour meter socket which is provided with means for by-passing the meter-socket contact prior to removal of the meter, thus enabling current to be supplied when necessary, and when the interruption of the current supply by removal of the meter, would otherwise occur. Also, provision is made to loosen the socket contacts when the current by-pass is activated, thus facilitating disengagement of the meter contact and the removal of the meter, and to tighten the socket contacts when the meter is restored and the by-pass deactivated. The invention resides in the simplicity of the means provided for accomplishing these operations.

10 Claims, 7 Drawing Figures

INVENTOR
ALEXANDER R. NORDEN
BY Harry Cohen
ATTORNEY

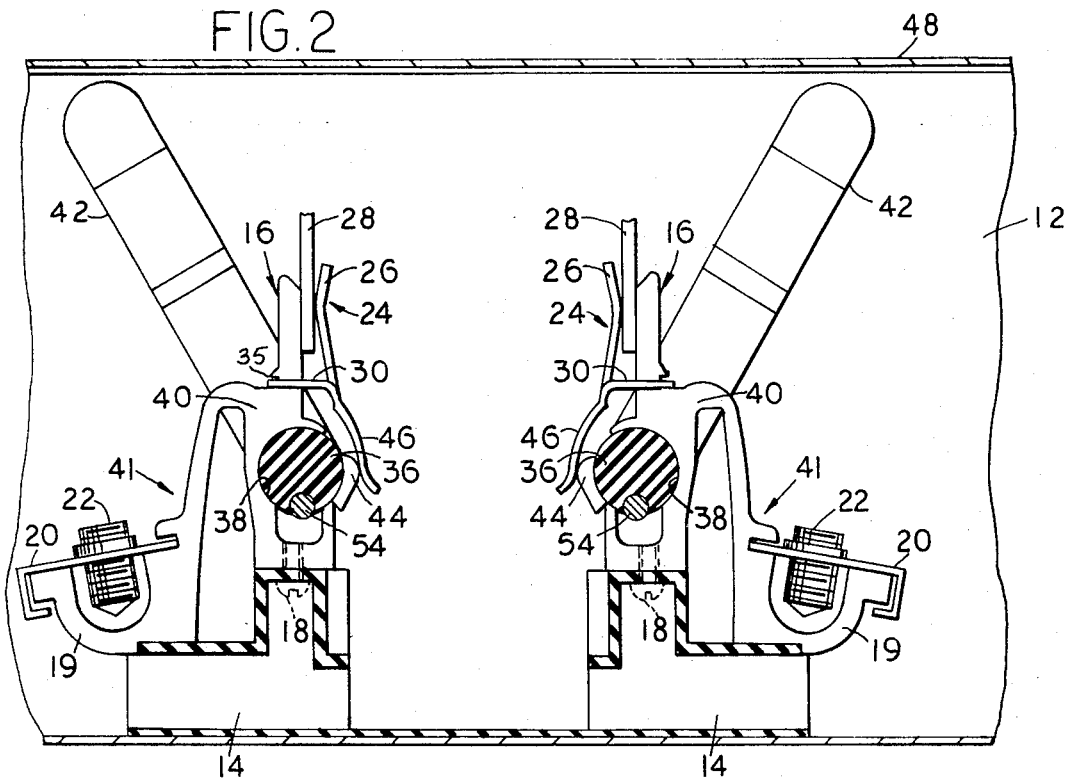

PATENTED OCT 9 1973 3,764,956

INVENTOR
ALEXANDER R. NORDEN
BY
ATTORNEY

ELECTRIC METER SOCKET

BACKGROUND OF THE INVENTION

1. Field of the Invention

This invention relates to sockets for watt-hour electric meters.

2. Description of the Prior Art

Meter sockets provided with current by-pass means and with means to loosen the engagement of the socket contacts, when the meter is to be removed are known, as shown for example by U.S. Pat. No. 3,003,085.

SUMMARY OF THE INVENTION

In accordance with the present invention, the meter socket comprises a pair of insulation supports secured within an enclosure, two contact members mounted on each of said insulation supports, spring members mounted on said contact members, and relatively movable thereon to engage companion meter contacts tightly in the normal operation of the meter and relatively movable from said tight engagement to retracted positions to facilitate disengagement of the meter contact therefrom when the meter is to be removed, and current by-pass means in the form of simple conductors which automatically connect in series the two contact members on each insulation support when said spring members are moved to their relatively retracted positions, and individual actuating members associated with each insulation support for effecting said relative movement of said spring members to or from their retracted positions and to simultaneously couple to uncouple each current by-pass to or from an associated pair of said contact members.

The provision of a meter socket in accordance with this summary of the invention and of comparatively simple construction constitutes the primary object of this invention.

BRIEF DESCRIPTION OF THE DRAWINGS

FIG. 2 is a sectional view on the line 2—2 of FIG. 1 showing the meter contacts connected in the socket;

FIG. 3 is a view similar to FIG. 2, the meter being removed and the current by-passes being connected in the load circuit;

DESCRIPTION OF THE PREFERRED EMBODIMENT OF THE INVENTION

Figure 1:
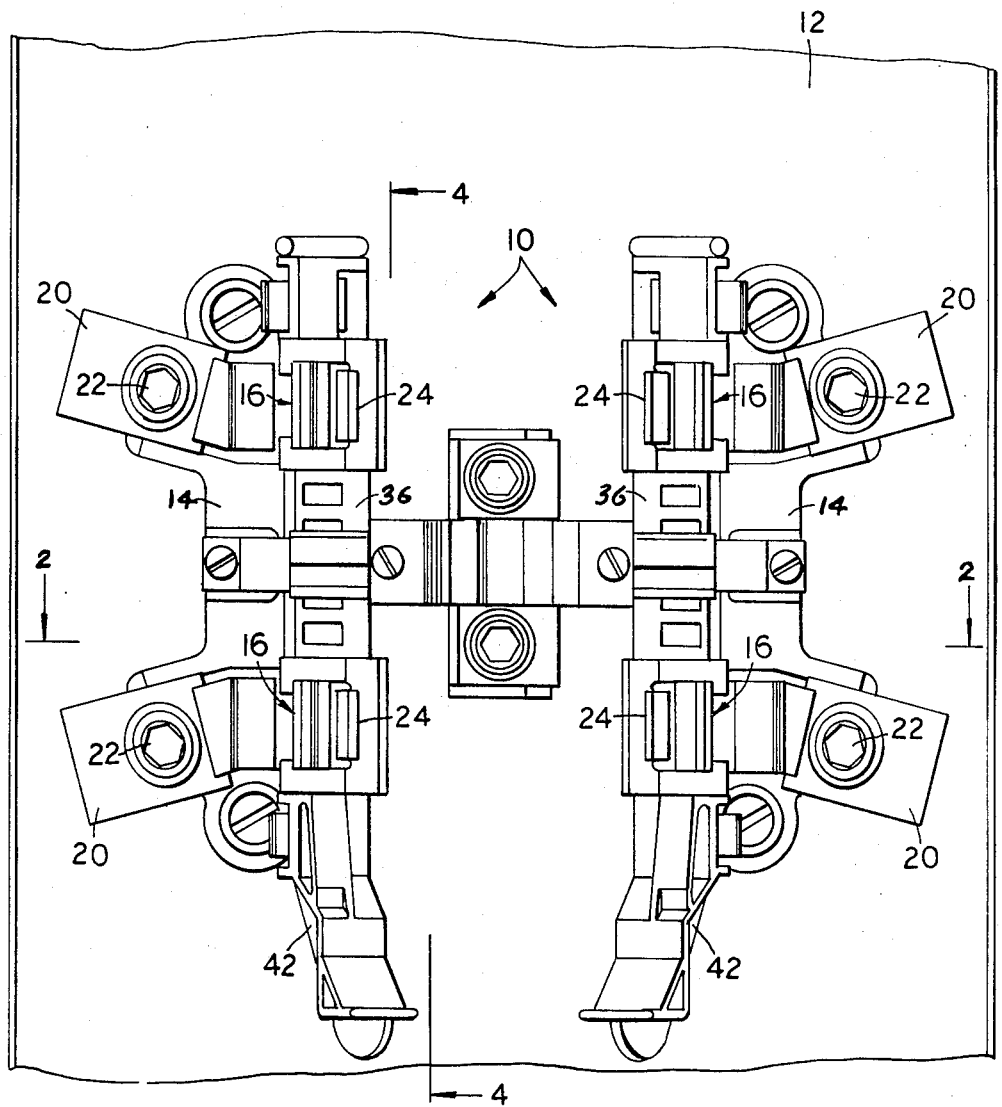
FIG. 1 is a view in elevation of the meter socket disposed within an enclosure only part of which is shown.
Figure 7:
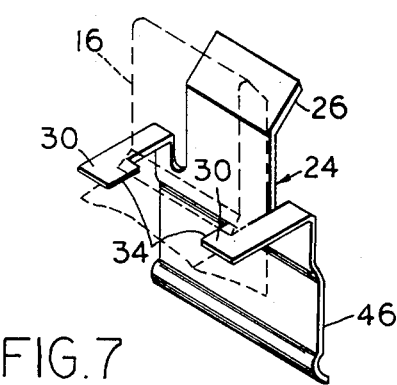
FIG. 7 is a perspective view of one of the socket spring members.
Figure 4:
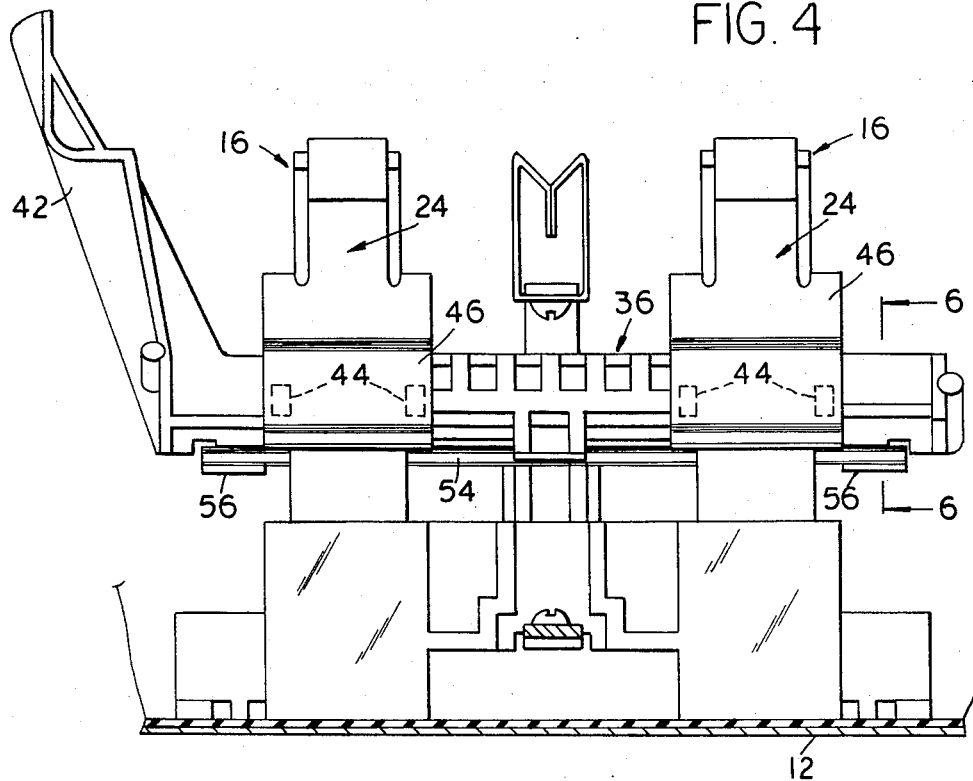
FIG. 4 is a sectional view on the line 4—4 of FIG. 1.
Figure 5:
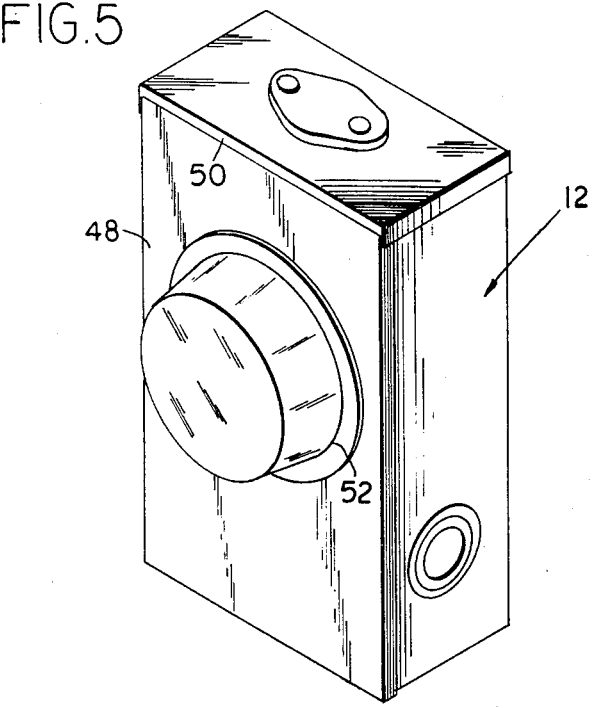
FIG. 5 is a perspective view of the enclosure for the meter socket and shows the meter mounted in position.

The meter socket 10 (FIGS. 1 to 4, 6 and 7) is secured within an enclosure 12 (FIGS. 1 – 5). The socket comprises molded insulation supports 14, there being two such supports which are disposed in confronting relation as clearly shown by FIGS. 2 and 3. On each support there are two contact members 16 spaced longitudinally of the companion support secured thereto by screws 18. Contact 16 has a terminal part 19 to receive a supply conductor (not shown), a screw threaded cap 20 being mounted on said part 19 for adjustable engagement by a screw 22 for clamping the supply conductor in said terminal part 19. Each contact member 16, which is stationary, has a relatively movable spring member 24 associated therewith, said spring member 24 being relatively movable in relation to its companion contact member 16 on which it is mounted as bset shown in FIGS. 2, 3 and 7. Each spring member 24 has a meter-contact engaging portion 26 which cooperates with the companion contact 16 to engage a meter-contact indicated at 28 in FIG. 2.

Spring member 24 is movable in relation to its companion contact 16 to a retracted position to loosen the engagement of the meter-contact 28 whereby to facilitate removal of the meter from the enclosure. For this purpose spring member 24 has arms 30 (FIG. 7) which straddle the companion stationary contact member 16 and are mounted on said member 16. Spring member 24 pivots at the ends 34 of arms 30, said ends 34 being received in notch 35 adjacent shoulder 32 of contact 16.

A molded insulation actuating member 36 is mounted for turning movement about its longitudinal axis. For this purpose said actuating member 36 is disposed in openings 38 of members 40 which, as here shown, are integral parts of the unit 41 which includes the contact 16 and its terminal 19. An insulation handle 42 integral with actuating member 36 is provided at one end of the latter for turning it about its longitudinal axis to and from the positions illustrated by FIGS. 2 and 3. The actuator 36 is provided with integral camming portions 44 which are operable to engage the skirt 46 of spring member 24 for biasing the spring members 24 into clamping relation with the meter contact members 28 when the handle is turned to the position illustrated by FIG. 2 and to release the clamping action when the handle is moved to the position illustrated by FIG. 3 so that the meter may be more easily removed from the meter socket.

It will be understood that the cover 48 of the meter enclosure may be removed from the enclosure under authorized supervision. For this purpose the enclosure has a portion 50 which overlaps the cover 48 and the cover has an opening 52 which is large enough to allow the cover 48 to move sufficiently to enable its removal from the enclosure 12 so that access may be had to the handles 42 within the enclosure 12. The length and angular movement of handles 42 is such as to permit the cover 48 to close on enclosure 12 when the socket is in its normal operating condition (FIG. 2), and to prevent such closing when the meter is by-passed (FIG. 3).

Figure 6:
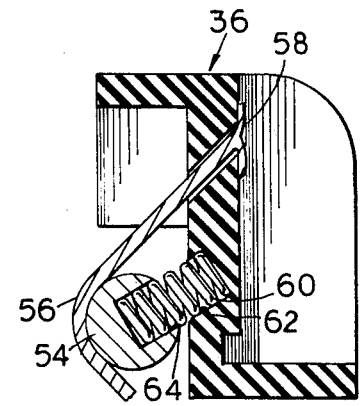
FIG. 6 is a sectional view on the line 6—6 of FIG. 4.

As above indicated, it is necessary or desirable at certain times to supply current to the load even when the meter is removed from the socket. This is accomplished in accordance with the present invention by the provision of an electrically conductive rod 54 mounted on the retaining clamps 56 held in place in the actuator 36 by bent ends 58 (FIG. 6). A compression spring 60 having one end disposed in a recessed portion 62 of the actuator and its opposite end portion secured in a recess 64 in rod 54 holds said rod in place. When the actuator is moved in a direction to unclamp the socket contacts from the meter contacts, a rod 54 is simultaneously moved into contact with the portion 66 of the above-described contact unit 41 so that current may be supplied to the load notwithstanding the removal of the meter from the socket. On the other hand when the handles are moved to the position illustrated by FIG. 2 in order to clamp the meter contacts between the companion socket contact members, the by-pass rod 54 is disengaged from the contact unit bar 66.

While I have shown and described the preferred embodiment of my invention it will be understood that the invention may be embodied otherwise than as herein expressly shown or described and that said embodiment certain changes in the details or construction and in the arrangement of parts may be made without departing from the invention within the scope of the appended claims.

Whats claim is

1. A watt-hour meter socket, comprising insulative support means, a plurality of sets of spaced contact members mounted on said support means and arranged thereon to receive the the meter-contacts, respectively, each of said sets of contact members comprising two contact members spaced from each other longitudinally of said support means, each of said contact members coacting with a spring member to clamp a meter-contact between the contact member and itself and which has a limited movement to a retracted position to unclamp said meter contact, an actuator means extending between two of said longitudinally spaced contact members of each set and movably engageable with said spring members for moving the latter toward and away from the companion contact members, respectively to clamp and unclamp the companion meter-contacts, respectively, said actuator means comprising two separate actuators, one for each set of said contact members, said actuators extend longitudinally between the spaced contact members of each set and are turnable about their longitudinal axes by said handles, respectively. and means operable under the control of said actuator means for electrically by-passing said sets of contacts when the movable contact members of said sets are moved to unclamp the meter-contacts.

2. A watt-hour meter socket according to claim 1, wherein the by-passing means is mounted on said actuator means and is movable by the latter to a position for by-passing said pairs of contacts when the latter are unclamped from the meter-contacts.

3. A watt-hour meter socket according to claim 1, wherein the by-passing means comprises an electrically conductive member mounted on each of said actuators.

4. A watt-hour meter socket according to claim 1, wherein said contacts of each set are electrically coupled in an electrically conductive unit to which said by-passing means is electrically coupled when the movable spring members are moved to unclamp the meter-contacts.

5. A watt-hour meter socket according to claim 1, wherein each of said actuators is provided with cam means engageable with parts of the movable spring members of each set for moving said parts into releasable clamping engagement with the meter-contacts, respectively.

6. A watt-hour meter socket according to claim 5, wherein each of said actuators carries a by-passing conductor.

7. A watt-hour meter socket according to claim 1, wherein the movable spring members of each set of contact members are movably mounted on the contact members of the same set and have parts engageable by said actuator means for moving the movable spring members to meter-contact clamp position.

8. A watt-hour meter socket according to claim 1, wherein the support means has two sets of said contact members thereon and wherein said actuator means comprises two actuators, one for each of said two sets of contact members, each of said actuators having an operating handle.

9. A watt-hour meter socket according to claim 8, wherein each of said actuators is provided with cam means engageable with parts of the movable spring members of each set for moving said parts into releasable clamping engagement with the meter-contacts, respectively.

10. A watt-hour meter socket according to claim 9, wherein the movable spring members of each set of contact members are movably mounted on the contact members of the same set and have parts engageable by said actuator means for moving the movable spring members to meter-contact clamp position.

* * * * *